Patented Sept. 19, 1950

2,523,187

UNITED STATES PATENT OFFICE 2,523,187

ESTERS OF 2,4-DICHLOROPHENOXY-ACETIC ACID

Edgar C. Britton and Louis E. Begin, Midland, Mich., assignors to The Dow Chemical Company, Midland, Mich., a corporation of Delaware No Drawing. Application May 22, 1948,
Serial No. 28,733

7 Claims. (Cl. 260—473)

The present invention relates to esters of 2,4-dichlorophenoxy-acetic acid and is particularly concerned with compounds having the following formula:

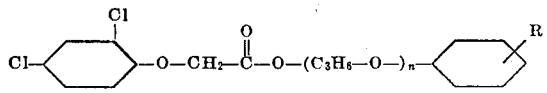

Wherein $n$ is an integer not greater than 2, and R represents a member of the group consisting of hydrogen and the lower alkyl radicals containing from 1 to 4 carbon atoms, inclusive. These compounds are adapted to be employed as modifiers in plastic compositions; preservatives for paper, cellulosic textiles, and wood; plant growth control materials; and as intermediates for the preparation of more complex organic derivatives.

The new esters are crystalline solids or oils, somewhat soluble in many organic solvents, and substantially insoluble in water. These compounds are stable to light and air, not appreciably affected by carbon dioxide, of low volatility, and non-corrosive to the skin of man and higher animals.

The compounds may be prepared by reacting a molecular proportion of (1) 2,4-dichlorophenoxy-acetic acid and (2) at least a molecular proportion of an aryl monoether of mono- or dipropylene glycol, such as phenoxy-propanol, methyl-phenoxy-propanol, ethyl-phenoxy-propanol, propyl-phenoxy-propanol, butyl-phenoxy-propanol, phenoxy-propoxy - propanol, methyl - phenoxy-propoxy-propanol, ethyl-phenoxy-propoxy-propanol, propyl-phenoxy-propoxy-propanol, and butyl-phenoxy-propoxy-propanol. Better yields are obtained when an excess of the ether-alcohol is employed, and the water of reaction is removed as formed. The reaction is carried out in the presence of a dehydration catalyst, such as sulphuric acid.

In the preferred method of preparation, 2,4-dichlorophenoxy-acetic acid, an excess of the glycol aryl ether, and the catalyst are mixed together and heated for one hour or longer at a temperature of 50° to 60° C. The reaction mixture is then heated under reduced pressure to remove water of reaction together with some of the excess of the ether-alcohol. Some water-immiscible solvent such as carbon tetrachloride is then added to the mixture and the catalyst and unreacted 2,4-dichlorophenoxy-acetic acid are neutralized with an alkali such as dilute aqueous sodium carbonate. The resulting mixture divides into aqueous and solvent layers. The solvent layer is separated from the aqueous and washed several times with water to extract the water-soluble salts of catalyst and unreacted 2,4-dichlorophenoxy-acetic acid. The solvent is then removed by distillation under reduced pressure to obtain the ester.

In an alternative procedure, the reaction is carried out in a water-immiscible solvent, such as ethylene dichloride. Good yields are obtained when substantially equimolecular proportions of the ether-alcohol and 2,4-dichlorophenoxy-acetic acid are employed. The reactants are dispersed in the solvent and heated together for two hours or longer at the boiling temperature of the mixture. A mixture of the solvent and water of reaction are continuously distilled out of the reaction vessel, condensed, and the solvent recovered. Additional solvent is introduced into the reaction zone as may be necessary. Upon completion of the reaction the mixture is neutralized as with dilute aqueous sodium carbonate and the aqueous and solvent layers separated. The solvent layer is washed several times with water to remove the water-soluble salts of catalyst and unreacted 2,4-dichlorophenoxy-acetic acid. The solvent is then removed by distillation under reduced pressure to obtain the ester product.

The mono- and dipropylene glycol aryl ethers employed in these preparations may be obtained by the reaction of propylene oxide with phenol or an alkyl phenol, such as methyl-phenol, ethyl-phenol, propyl-phenol, or butyl-phenol. The reaction is carried out in the presence of sodium hydroxide as catalyst. The desired products formed in this reaction are the aryloxy-propyl-propanols, and the 1-aryloxy-2-propanols. In one method of preparing the compounds, the reactants are mixed and heated together in the presence of the catalyst for ½ hour at a temperature of 170° C. and under a pressure of 200 pounds per square inch. The individual ether-alcohols are then separated by subjecting the mixed reaction product to fractional distillation under reduced pressure.

The following examples illustrate the invention but are not to be construed as limiting the same.

Example 1

331.5 grams (1.5 moles) of 2,4-dichlorophenoxy-acetic acid, 342 grams (2.25 moles) of 1-phenoxy-2-propanol (boiling at 233° C. at 760 millimeters pressure), and 2 milliliters of sulphuric acid were heated together for one hour at a temperature of 50° to 60° C. The reaction mixture was then placed under reduced pressure and the temperature gradually increased to distill a mixture of water and phenoxy-propanol out of the reaction zone until the pot temperature reached 110° C. and no more water was given off. Upon completion of the reaction the mixture was diluted with carbon tetrachloride and neutralized with dilute aqueous sodium carbonate. The solvent and aqueous layers were separated and the solvent layer washed several times with water to extract the water-soluble salts of catalyst and unreacted 2,4-dichlorophenoxy-acetic acid. The carbon tetrachloride was then removed by distillation at reduced pressure to obtain the 1-phenoxy-2-propyl ester of 2,4-dichlorophenoxy-acetic acid. This ester was a crystalline-solid having a melting point of 85.5° C., and a chlorine content of 19.9 per cent as compared to the theoretical chlorine content for $C_{17}H_{16}Cl_2O_4$ of 20.0 per cent.

*Example 2*

221 grams (1 mole) of 2,4-dichlorophenoxy-acetic acid, 210 grams (1 mole) of dipropylene glycol phenyl ether (phenoxy-propoxy-propanol) boiling at 285.7° C. at 760 millimeters pressure, 200 milliliters of ethylene dichloride, and 2 milliliters of sulphuric acid were heated together for 2 hours at a pot temperature of 100° to 130° C. The operation was carried out with continuous distillation of ethylene dichloride together with the water of reaction as formed, separation of the water, and recycling of the ethylene dichloride. The reaction mixture was then neutralized with dilute aqueous sodium carbonate and washed several times with water to remove the water-soluble salts of catalyst and unreacted 2,4-dichlorophenoxy-acetic acid. The excess ethylene dichloride was removed by distillation at reduced pressure, to obtain the phenoxy-propoxy-propyl ester of 2,4-dichlorophenoxy-acetic acid. This product was an oily liquid having a refractive index ($n$/D) of 1.5393 at 60° C., and a chlorine content of 17.7 per cent. The theoretical chlorine content for $C_{20}H_{22}Cl_2O_5$ is 17.2 per cent.

*Example 3*

221 grams (1 mole) of 2,4-dichlorophenoxy-acetic acid, 208 grams (1 mole) of 1-(4-tertiary-butyl-phenoxy-2-propanol (boiling at 288.8° C. at 760 millimeters pressure), 200 milliliters of ethylene dichloride, and 2 milliliters of sulphuric acid were reacted by the method of Example 2 to obtain the 1-(4-tertiarybutyl-phenoxy)-2-propyl ester of 2,4-dichlorophenoxy-acetic acid. This product was a crystalline solid having a melting point of 99° C., a chlorine content of 17.3 per cent, and a saponification number of 141. The theoretical chlorine content and saponification number for $C_{21}H_{24}Cl_2O_4$ are 17.3 per cent and 137, respectively.

*Example 4*

The (4-secondarybutyl-phenoxy)-propoxy-propyl ester of 2,4-dichlorophenoxy-acetic acid was prepared from (4-secondarybutyl-phenoxy)-propoxy-propanol (boiling at 145° C. at 0.5 millimeter pressure) and 2,4-dichlorophenoxy-acetic acid by the method of Example 2. This ester was an oily liquid having a refractive index ($n$/D) of 1.5302 at 60° C. and a chlorine content of 15.8 per cent as compared to the theoretical chlorine content for $C_{24}H_{30}Cl_2O_5$ of 15.8 per cent.

*Example 5*

The 1-(2-secondarybutyl-phenoxy)-2-propyl ester of 2,4-dichlorophenoxy-acetic acid was prepared from 2,4-dichlorophenoxy-acetic acid and 1-(2-secondarybutyl-phenoxy)-2-propanol (boiling at 294.3° C. at 760 millimeters pressure) by the method of Example 2. This ester was an oily liquid having a refractive index ($n$/D) of 1.5403 at 60° C. and a chlorine content of 17.3 per cent. The theoretical chlorine content for $C_{21}H_{24}Cl_2O_4$ is 17.3 per cent.

We claim:

1. The esters of 2,4-dichlorophenoxy-acetic acid having the formula:

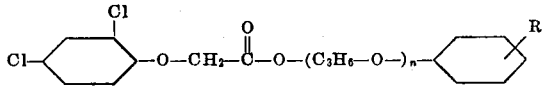

wherein $n$ is an integer not greater than 2 and R represents a member of the group consisting of hydrogen and the lower alkyl radicals containing from 1 to 4 carbon atoms, inclusive.

2. The esters of 2,4-dichlorophenoxy-acetic acid having the formula:

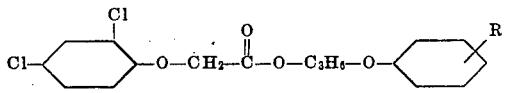

wherein R represents a member of the group consisting of hydrogen and the lower alkyl radicals containing from 1 to 4 carbon atoms, inclusive.

3. The esters of 2,4-dichlorophenoxy-acetic acid having the formula:

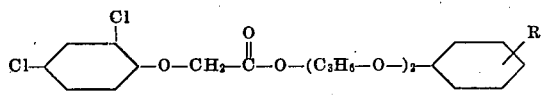

wherein R represents a member of the group consisting of hydrogen and the lower alkyl radicals containing from 1 to 4 carbon atoms, inclusive.

4. The 1-phenoxy-2-propyl ester of 2,4-dichlorophenoxy-acetic acid.

5. A 1-(4-butyl-phenoxy)-2-propyl ester of 2,4-dichlorophenoxy-acetic acid.

6. The phenoxy-propoxy-propyl ester of 2,4-dichlorophenoxy-acetic acid.

7. The (4-secondarybutyl-phenoxy)-propoxy-propyl ester of 2,4-dichlorophenoxy-acetic acid.

EDGAR C. BRITTON.
LOUIS E. BEGIN.

REFERENCES CITED

The following references are of record in the file of this patent:

UNITED STATES PATENTS

| Number | Name | Date |
|---|---|---|
| 2,142,126 | Grether | Jan. 3, 1939 |
| 2,166,557 | Stoesser et al. | July 18, 1939 |
| 2,322,760 | Lontz | June 29, 1943 |
| 2,396,513 | Jones | Mar. 12, 1946 |